United States Patent
Hoek

[11] Patent Number: 6,113,241
[45] Date of Patent: *Sep. 5, 2000

[54] ADJUSTABLE REARVIEW MIRROR FOR VEHICLES

[75] Inventor: Steven G. Hoek, West Olive, Mich.

[73] Assignee: Donnelly Corporation, Holland, Mich.

[*] Notice: This patent is subject to a terminal disclaimer.

[21] Appl. No.: 09/310,162

[22] Filed: May 10, 1999

Related U.S. Application Data

[63] Continuation of application No. 08/821,458, Mar. 21, 1997, Pat. No. 5,903,402.

[51] Int. Cl.⁷ .................................................... G02B 5/08
[52] U.S. Cl. ........................... 359/841; 248/549; 248/900
[58] Field of Search ................................ 359/841, 871, 359/872, 881; 248/476, 478, 549, 900

[56] References Cited

U.S. PATENT DOCUMENTS

| | | | |
|---|---|---|---|
| D. 285,549 | 9/1986 | Haack | D12/187 |
| D. 331,216 | 11/1992 | McGouldrick | D12/187 |
| 3,118,965 | 1/1964 | Jones | 88/93 |
| 3,119,591 | 1/1964 | Malecki | 248/282 |
| 3,420,490 | 1/1969 | Malachowski | 248/486 |
| 4,135,694 | 1/1979 | Stegenga et al. | 218/478 |
| 4,315,614 | 2/1982 | Stegenga et al. | 248/479 |
| 4,730,913 | 3/1988 | Boothe | 359/881 |
| 4,793,582 | 12/1988 | Bronstein et al. | 248/486 |
| 4,815,836 | 3/1989 | Byers et al. | 248/475.1 |
| 4,907,871 | 3/1990 | Hou | 359/841 |
| 4,911,545 | 3/1990 | Miller | 359/841 |
| 4,921,337 | 5/1990 | Hou | 359/841 |
| 4,998,812 | 3/1991 | Hou | 359/841 |
| 5,096,283 | 3/1992 | Croteau | 359/865 |
| 5,217,197 | 6/1993 | Spitzer | 248/479 |
| 5,292,100 | 3/1994 | Byers et al. | 248/480 |
| 5,483,385 | 1/1996 | Boddy | 359/841 |
| 5,489,080 | 2/1996 | Allen | 248/480 |
| 5,513,048 | 4/1996 | Chen | 359/881 |
| 5,546,239 | 8/1996 | Lewis | 359/855 |
| 5,572,376 | 11/1996 | Pace | 359/877 |
| 5,903,402 | 5/1999 | Hoek | 359/841 |

*Primary Examiner*—Cassandra Spyrou
*Assistant Examiner*—Mark A. Robinson
*Attorney, Agent, or Firm*—Van Dyke, Gardner, Linn & Burkhart, LLP

[57] ABSTRACT

An exterior rearview mirror assembly, especially suited for towing vehicles, includes a dual purpose spring that provides a break-away feature and holds a mirror subassembly in one of a plurality of positions along a mounting arm. The exterior rearview mirror assembly includes a housing supporting a reflective element, a mounting bracket adapted for mounting to a vehicle, and an arm supporting the housing and mounted to the mounting bracket. The arm is adapted to pivot about the mounting bracket between a normal operating position and a folded, break-away position and includes a spring cooperating with the arm to selectively bias the arm into frictional engagement with the housing to hold the housing and mirror-subassembly in a fixed position along the arm and with the mounting bracket to hold the arm in one of the two positions. The bias on the arm is released when the arm is pivoted about the mounting bracket to the folded, break-away position to allow sliding movement of the housing and mirror subassembly along the arm.

45 Claims, 4 Drawing Sheets

ADJUSTABLE REARVIEW MIRROR FOR VEHICLES

This is a continuation of Ser. No. 08/821,458, now U.S. Pat. No. 5,903,402, filed on Mar. 21, 1997. This is a continuation application of co-pending application Ser. No. 08/821,458, filed Mar. 21, 1997, by Steven G. Hoek, entitled *AJUSTABLE EXTERIOR REARVIEW MIRROR FOR VEHICLES*.

TECHNICAL FIELD AND BACKGROUND OF THE INVENTION

The present invention relates to an exterior rearview mirror for mounting on a vehicle and, more particularly, to an extendable exterior rearview mirror for mounting on a vehicle which can be extended when the vehicle is used for towing a trailer, camper, another vehicle, or the like.

Conventional towing mirrors include a reflective element housed in a frame that is mounted to the body of a vehicle by a support and mounting bracket. The support extends the mirror a greater distance from the body of the vehicle than conventional exterior rearview mirrors in order to provide an unobstructed view to the rear of the towed object. For example, U.S. Pat. No. 3,119,591 to A. J. Malecki discloses a rigid support for eccentrically mounting a mirror assembly to a vehicle in a fixed extended position. Naturally, these fixed extended rearview mirror assemblies increase the width of the vehicle. In some vehicles, the width is increased beyond the maximum width allowed by conventional vehicle transport trucks which deliver the vehicles to the dealership. Therefore, these mirror assemblies are typically installed at the dealership, which ultimately increases the cost of the vehicle.

In addition, use of the prior known fixed, extended rearview mirror assemblies is also inconvenient for the driver who only occasionally tows a trailer. Since such mirror assemblies substantially increase the width of the vehicle, they hamper normal maneuvering through passages, such as those defined by garage door openings, drive through banking structures, and the like. Furthermore, they are more vulnerable to being damaged or causing damage than conventional exterior rearview mirrors, especially when used by an inexperienced driver. This inconvenience is compounded by the fact that, not only do these extended rearview mirrors generally detract from the appearance of the vehicle, they increase the cost of the vehicle.

In response to the needs of the drivers who only occasionally tow objects, several extendible mirror assemblies have been developed. For example, in U.S. Pat. Nos. 5,513,048 and 5,489,080, each disclose mirrors supported on telescoping tubular members which are fixed in position by threaded fasteners. Though simple in construction, these telescoping members typically require the operator to use a tool to adjust the position of the mirror. Moreover, they tend to increase the vibration of the mirror assembly, which may in turn loosen the connection between the telescoping members of the mirror assembly, especially when the mirror assembly is in the outboard position.

In U.S. Pat. No. 5,546,239 to Lewis, an extendable mirror element is disclosed in which the mirror element is extended from the mirror casing to an outboard position. Again, the mounting bracketry lacks the structure to perform well in vibration. Furthermore, the mirror element is more vulnerable to damage.

In contrast, U.S. Pat. No. 5,572,376 to Pace discloses an extensible vehicle mirror which includes a rack and pinion drive system and drive motor to translate a mirror longitudinally along the mirror support arm. As a result, Pace's mirror assembly is relatively complicated and the associated parts increase the weight of the mirror assembly significantly. The more parts that require assembling, the greater the costs of manufacture. Moreover, weight increases of this magnitude tend to increase the vibration of the mirror assembly and degrade the performance of the mirror.

Consequently, there is a need for an extendable exterior rearview mirror that can be installed at the factory, which provides the extended field of view required when towing vehicles and yet can be retracted to a normal operating position where it does not hamper the maneuverability of the vehicle. Moreover, the extendable rearview mirror should have minimal impact on the vibration of the mirror assembly and be relatively easy to adjust between non-towing and towing positions without the need for tools.

SUMMARY OF THE INVENTION

Accordingly, the present invention provides an improved exterior rearview mirror assembly, especially suited for towing vehicles, which is adjustable between at least a retracted position for normal, non-towing use, and an extended position in which the mirror assembly is outboard of its normal position allowing an increased field or view to the rear of a towed trailer or the like. Additionally, the mirror assembly is pivotally mounted to break-away to a folded position in the event the mirror assembly strikes an object during use of the vehicle. These functions are provided by a dual purpose spring which provides the break-away feature and also holds the mirror subassembly in one of a plurality of positions along a mounting arm.

According to one aspect of the invention, a vehicle exterior rearview mirror assembly includes a mounting bracket adapted for mounting to a vehicle, a mirror subassembly having a housing and a reflective element supported by the housing, and an arm supported by the mounting bracket. The arm is mounted for pivotal movement about the mounting bracket between a normal operating position and a folded, break-away position. The mirror subassembly is supported by the arm and mounted for selective movement along the arm between at least an inboard and outboard position when the arm is in the folded, break-away position and for retention in a fixed position along the arm when the arm is in the normal operating position.

In one form, the arm includes a spring, which biases the arm into frictional engagement with the mirror subassembly to limit movement of the mirror subassembly along the arm when the arm is in the normal operating position. Preferably, the spring also biases the mirror subassembly into frictional engagement with the mounting bracket when the arm is in the normal operating position to thereby limit the rotation of the arm about the mounting bracket.

In other preferred aspects, the arm is adapted to apply a compressive force to the spring when the arm is in the normal operating position, wherein the compressed spring biases the arm into frictional engagement with the mirror subassembly. The compressive force is relieved from the spring when the arm is pivoted about the mounting bracket to the break-away position. In this manner, when the compressive force is relieved from the spring, the mirror assembly is substantially released from frictional engagement with the arm and is movable along the arm between the inboard and outboard positions. Preferably, the arm includes a projection for applying the compressive force to the spring.

In yet other aspects, the housing of the mirror subassembly includes a sleeve. The arm and spring extend into the sleeve, with the spring urging the arm into frictional engagement with the sleeve when the arm is pivoted to the normal operating position. The spring preferably extends along the arm from the mounting bracket into the sleeve to urge the arm into frictional engagement with the sleeve when the spring is compressed and to release the arm from frictional engagement with the sleeve when the spring is uncompressed. Preferably, the spring comprises a plate spring.

In further aspects, the mounting bracket includes at least one recess, and the arm includes at least one positioning member. The spring urges the positioning member into frictional engagement with the mounting bracket when the arm is pivoted about the mounting bracket to the normal operating position and urges the positioning member into engagement with the recess of the mounting bracket when the arm is pivoted about the mounting bracket to the break-away position, which releases the compressive force applied by the projection on the spring to thereby release the housing from frictional engagement with the arm. In this manner the spring provides a dual function: first, the spring provides a selectively releasable holding mechanism that fixes the position of the mirror subassembly along the arm; and second, the spring provides a break-away device, which fixes the position of the arm with respect to the mounting bracket until such a time that a force is applied to the mirror subassembly or arm that exceeds the frictional force between the positioning member and the mounting bracket.

In another preferred form, the vehicle exterior rearview mirror assembly includes a second arm which is mounted for pivotal movement about the mounting bracket between the normal operating position and the folded, break-away position. The mirror subassembly is also supported by the second arm. Preferably, the mirror subassembly is adapted to selectively move along the second arm between the inboard position and the outboard position when the second arm is pivoted to the folded, break-away position and adapted to be held in position along the second arm when the second arm is pivoted to the normal operating position.

As will be understood, the exterior rearview mirror assembly of the present invention provides numerous advantages over prior known mirror assemblies. The exterior rearview mirror provides the extended field of view required when towing vehicles and yet can be retracted to a normal operating position where it does not hamper the maneuverability of the vehicle or increase the width of the vehicle; therefore, the exterior mirror rearview mirror assembly of the present invention can be installed at the factory. Moreover, the extendable mirror subassembly of the exterior rearview mirror assembly has minimal impact on the vibration of the mirror assembly. Furthermore, the exterior rearview mirror assembly can be adjusted between an inboard, non-towing position and an outboard, towing position without tools.

These and other objects, advantages, purposes and features of the invention will become more apparent from the study of the following description taken in conjunction with the drawings.

DESCRIPTION OF THE PREFERRED EMBODIMENTS

Figure 1:
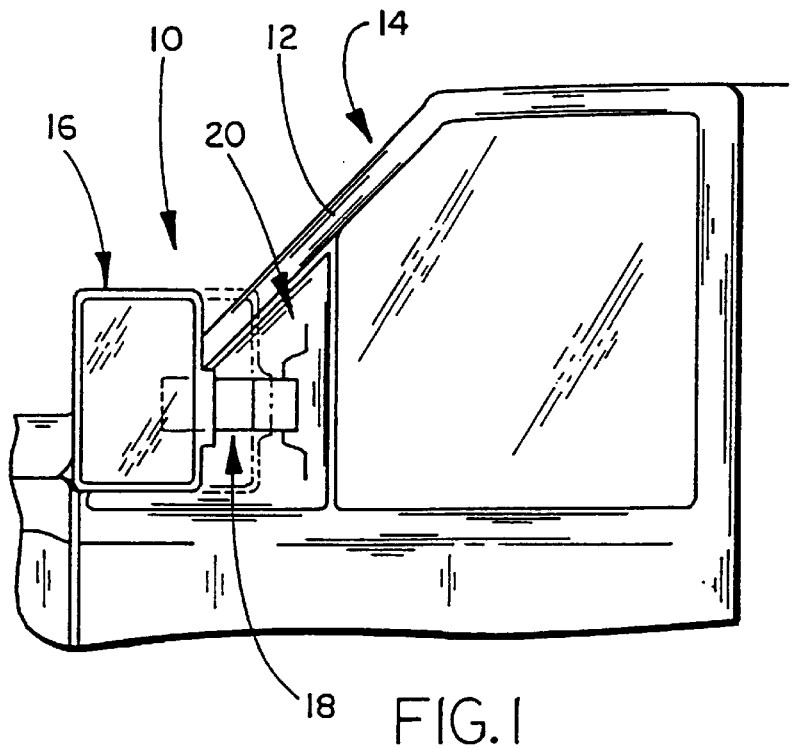
FIG. 1 is a side elevational view of an exterior rearview mirror assembly of the present invention installed on a vehicle door.

Referring to FIG. 1, an exterior rearview mirror assembly 10 of the present invention is shown mounted to a door 12 of vehicle 14. Rearview mirror assembly 10 includes a mirror subassembly 16, a swivel mounting arm 18 on which mirror subassembly 16 is supported, and a mounting bracket 20, which pivotally mounts arm 18 and mirror subassembly 16 to door 12. Mounting bracket 20 is preferably mounted to door 12 by conventional methods, such as fastening by a pair of threaded studs which pass through the door and are secured thereto with nuts.

Figure 2:
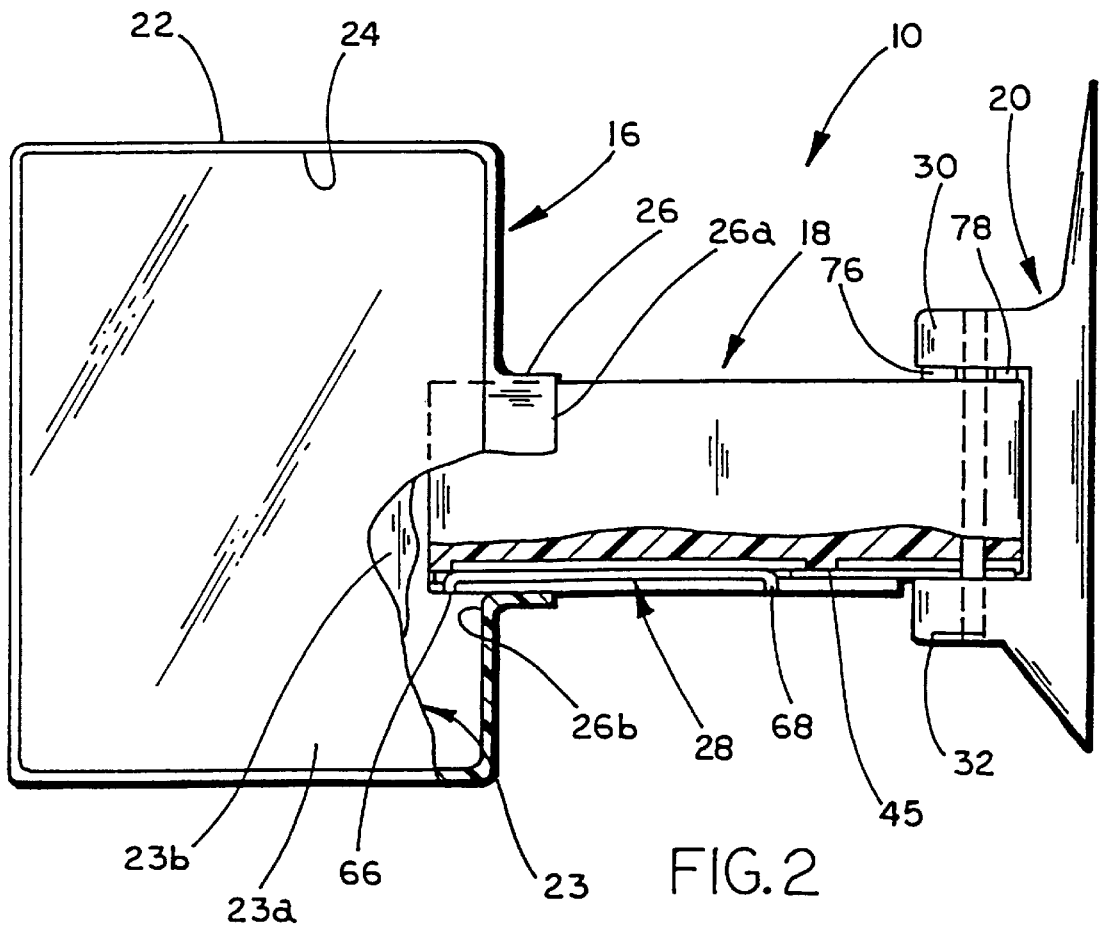
FIG. 2 is an enlarged elevational view of the exterior rearview mirror assembly.
Figure 3:
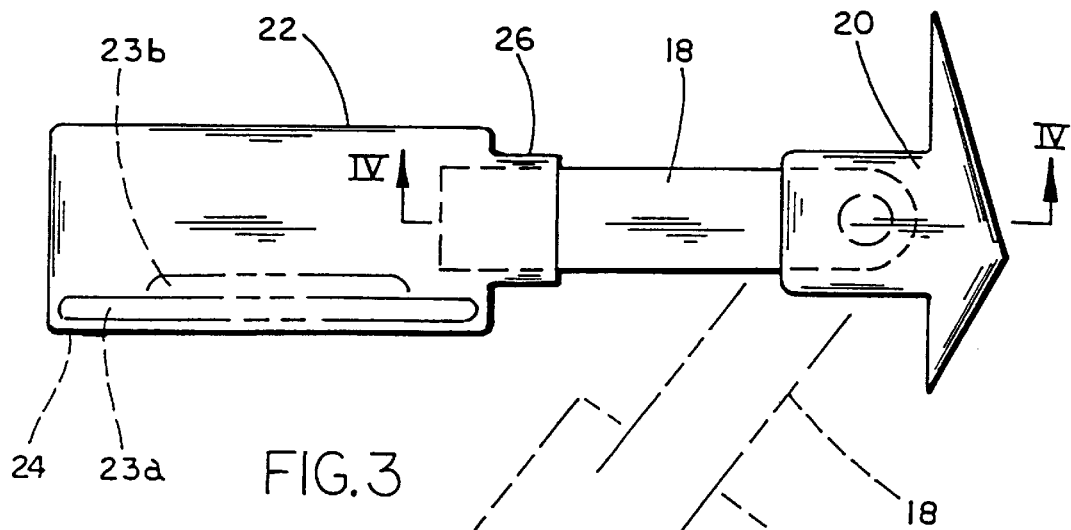
FIG. 3 is a top plan view of the exterior rearview mirror assembly of FIG. 1.

As best seen in FIGS. 2 and 3, mirror subassembly 16 includes a mirror case or housing 22 and a reflective element assembly 23, which is supported on or in mirror housing 22. Reflective element assembly 23 includes a reflective mirror element 23*a* and a backing plate 23*b*, which supports the reflective mirror element 23*a* in housing 22. Reflective element 23*a* may comprise a conventional chrome reflective element formed from glass or plastic with a chrome reflective layer on its first or second surface. Alternately, reflective element 23*a* may comprise a variable reflectance, electro-optic mirror element, such as an electrochromic cell.

Reflective assembly 23 may also include a bezel plate or bezel assembly and may include a manual or electric actuator to move the glass. Further details of the components of mirror subassembly 16 are omitted as mirror subassembly 16 may include a plurality of conventional components.

Housing 22 is preferably a modular housing and injection molded from non-electrically conductive material, such as a suitable thermoplastic resin. Housing 22 includes an opening 24 in which reflective element assembly 23 is aligned and a sleeve 26 for receiving mounting arm 18. Mirror subassembly 16 moves or telescopes up and down on arm 18 to permit the extension of mirror subassembly 16 from vehicle 14 between an inboard position and an outboard position. The outboard position provides a larger field of view which is suitable for viewing rearward of towed objects, such as campers, trailers, or the like. Mirror subassembly 16, however, is selectively biased into frictional engagement with arm 18 by a spring 28 to releasably fix or hold the position of mirror subassembly along arm 18, as will be discussed in more detail below.

Figure 4:
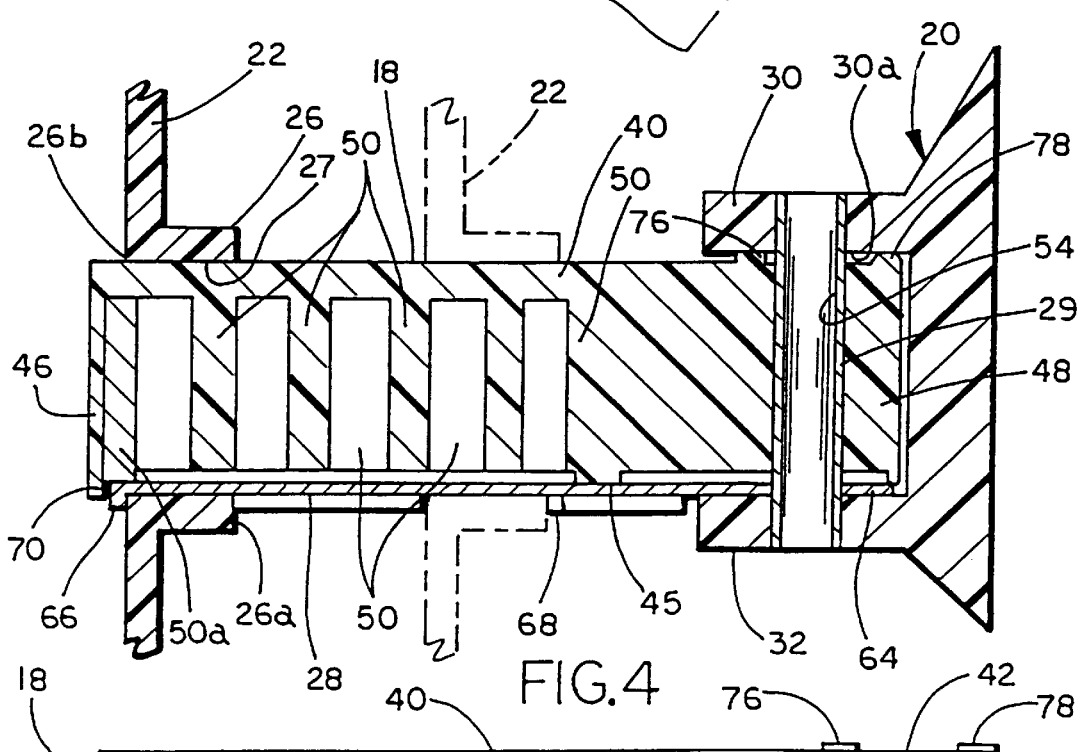
FIG. 4 is a cross sectional view taken along lines IV—IV of FIG. 3.

As best seen in FIG. 4, swivel mounting arm 18 is pivotally mounted to mounting bracket 20 on a pivot bushing 29 and is adapted for limited pivotal movement about bushing 29 between a normal operating position (indicated by the solid lines in FIGS. 1 and 3) and a breakaway position (indicated by the phantom lines in FIGS. 1 and 3). Pivot bushing 29 is supported by and extends between upper and lower flanges 30 and 32 of mounting bracket 20 to provide a pin connection between mounting arm 18 and mounting bracket 20. Pivotal movement of arm 18 about bushing 29 is limited by spring 28, which is interposed between arm 18 and lower flange 32 of mounting bracket 20 to provide a break-away device, further details of which will be provided in reference to the description of spring 28.

Figure 5:
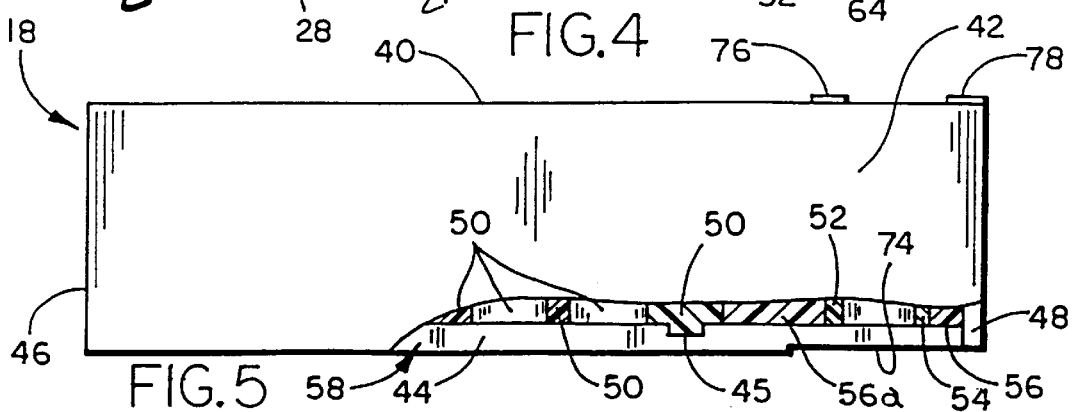
FIG. 5 is an enlarged partial cut-away view of a mounting arm of the exterior rearview mirror assembly.

Referring to FIGS. 4–7, swivel mounting arm 18 comprises a reinforced elongate box-shaped member preferably formed from a suitable thermoplastic resin having a top wall 40, opposed side walls 42 and 44, and two end walls 46 and 48. Extending transversely between side walls 42 and 44 and top wall 40 are a plurality of spaced, reinforcing webs 50 creating openings therebetween. Reinforcing webs 50 increase the stiffness of arm 18 without a corresponding increase in weight normally associated with a solid arm member. Furthermore, a reinforcing collar 52 is provided that extends from top wall 40 and encircles an opening 53 to form a cylindrical opening 54 to receive bushing 29. Top wall 40 and collar 52 are reinforced by a plurality of radial web segments 56, which extend between collar 52 and the respective top wall 40, side walls 42 and 44 and end wall 48. Further reinforcement is provided by a web 56a, which extends between collar 52 and adjacent web 50. As best seen in FIG. 5, end walls 46 and 48 and side walls 42 and 44 extend below webs 50, collar 52, web segments 56, and web 56a to thereby form an enclosure or seat 58 for spring 28.

Referring to FIGS. 2, 4, 8 and 9, spring 28 comprises an elongate, generally rectangular plate 60. Plate 60 is preferably formed from galvanized stainless steel and includes an opening 62 at one end 64 of plate 60 so that spring 28 can be pivotally coupled to bushing 29 along with mounting arm 18. Plate 60 further includes two spaced apart pairs of stops 66 and 68 for limiting the longitudinal movement of mirror subassembly 16 along mounting arm 18. Stops 66 and 68 may be formed from cut-away sections of plate 60 that are bent or angled downward to engage sleeve 26, which restricts the movement of mirror subassembly 16 along arm 18 between a normal operating, retracted position where the distal end 26a (FIG. 4) of sleeve 26 abuts stops 68 and a fully extended outboard or towing position where the inner proximate end 26b of sleeve 26 (FIG. 4) abuts stops 66. As best seen in FIG. 4, spring 28 extends between end walls 46 and 48 of arm 18, with one end 64 of spring 28 interposed between arm 18 and lower flange 32 and the other end 70 of spring 28 interposed and pinned between arm 18 and sleeve 26 of mirror subassembly 16. Furthermore, end 70 abuts end wall 46 and rests on an extended reinforcing web 50a to maintain spring 28 in a cooperative relationship with arm 18.

Figure 6:
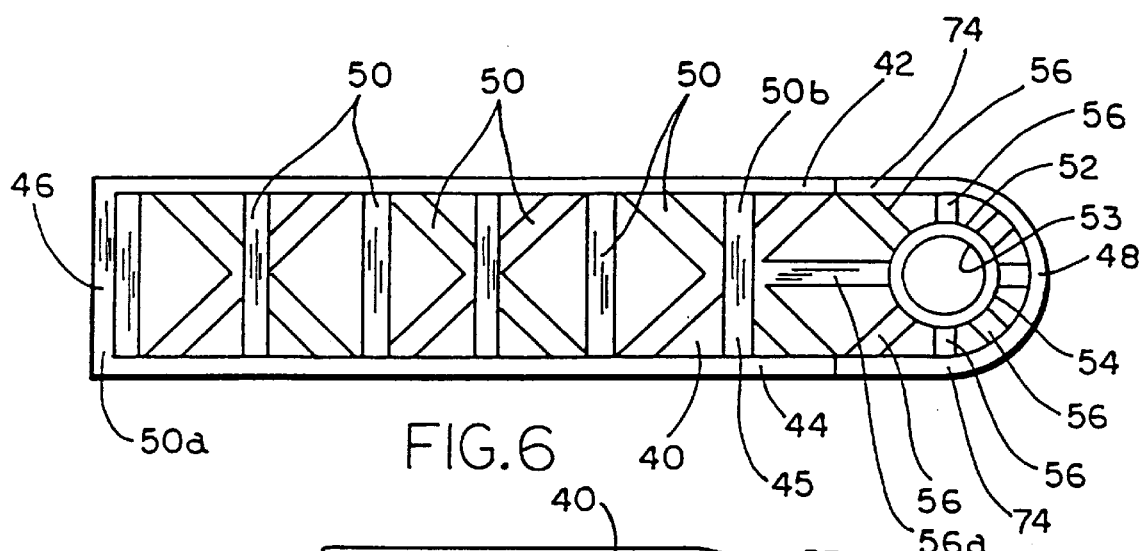
FIG. 6 is a bottom plan view of the mounting arm of FIG. 5.

As shown best in FIG. 4, to compress spring 28, mounting arm 18 includes a projection 45, which is provided by an enlarged reinforcing web 50b. Projection 45 acts as a fulcrum and pushes or applies a compressive force on a medial or central portion of spring 28, forcing spring 28 away from arm 18. Under the compressive force, spring 28 biases arm 18 into frictional engagement with a support surface 27 of sleeve 26 to hold the position of mirror subassembly 16 along arm 18. In response to the applied force from projection 45, spring 28 deflects, bending about ends 70 and 64. As spring 28 bends it generates a reactive, downward force on sleeve 26 and thereby pushes arm 18 upward to frictionally engage an upper inner, support surface 27 of sleeve 26, which frictionally holds mirror subassembly 16 in a fixed position along mounting arm 18. In a similar manner, when spring 28 bends about end 64 it generates a reactive downward force on lower flange 32 of mounting bracket 20, which causes arm 18 to move upwardly toward upper flange 30 and to frictionally engage upper flange 30 of mounting bracket 20. In order to pivot arm 18 about bushing 29 in mounting bracket 20, a force must be applied to mounting arm 18 or mirror subassembly 16 that exceeds the frictional force that is developed between arm 18 and upper flange 30 of mounting bracket 16 and that is sufficient to compress spring 28. To assure that spring 28 is properly seated against lower flange 32 of mounting bracket 20 and that arm 18 will not bind in mounting bracket 20 when it is pivoted about bushing 29, side walls 42 and 44 and end wall 48 include a cut-away or offset portion 74 (FIGS. 5 and 6).

Figure 7:
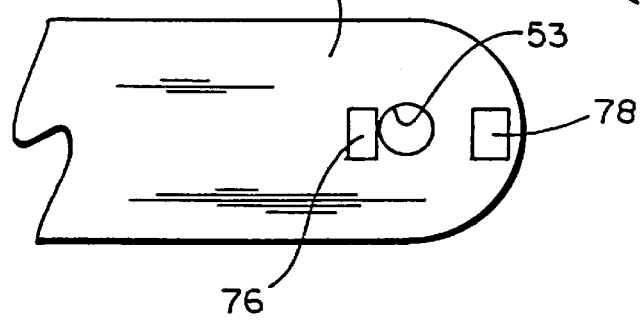
FIG. 7 is a partial top plan view of the mounting arm.
Figure 8:
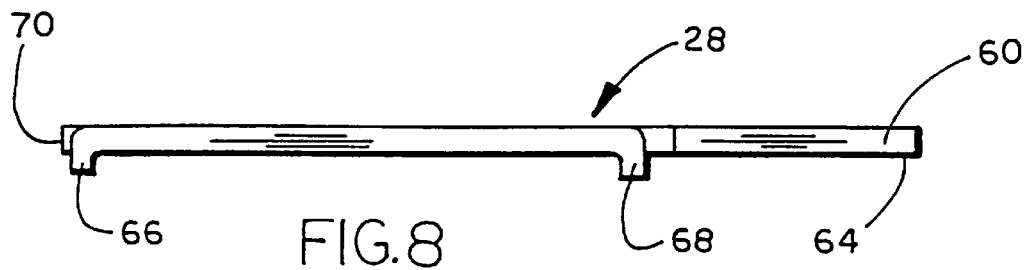
FIG. 8 is an enlarged side elevational view of a spring member of the exterior rearview mirror assembly.
Figure 9:
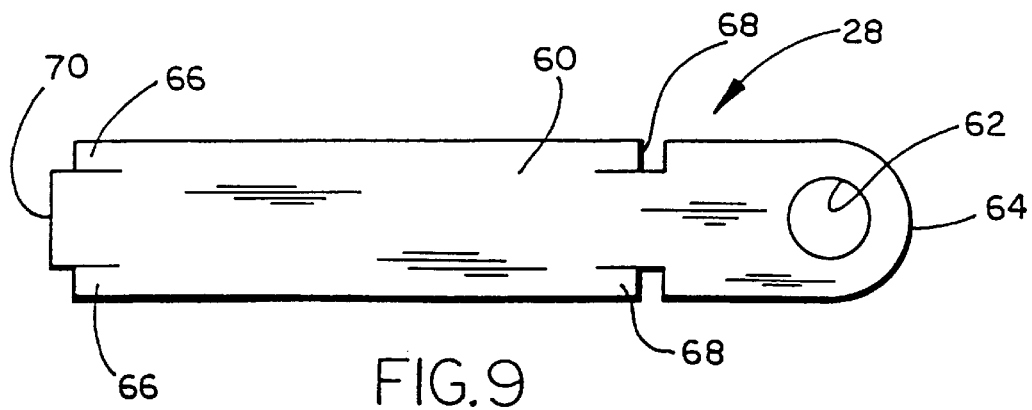
FIG. 9 is a top plan view of the spring of FIG. 8.
Figures 10, 11:
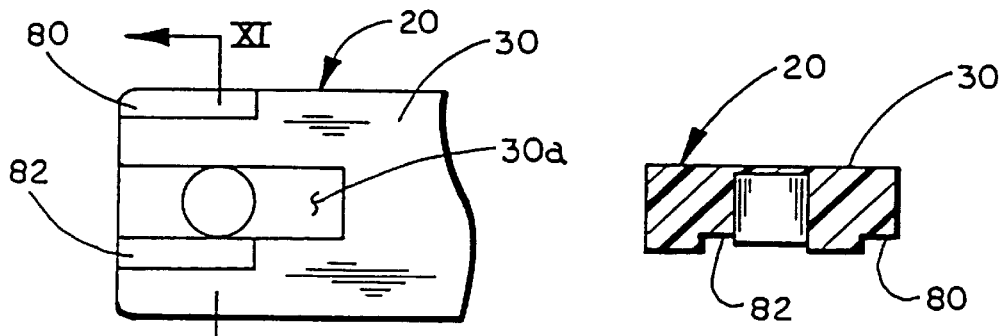
FIG. 10 is a partial bottom plan view of an upper flange of the mounting bracket of the exterior rearview mirror assembly.
FIG. 11 is a partial side elevational view of the upper flange of the mounting bracket taken along lines XI—XI of FIG. 10.

In order to release mirror subassembly 16 from frictional engagement with arm 18 and provide a break away release mechanism, mounting arm 18 is provided with a pair of engaging surfaces, such as projecting structures or positioning members 76 and 78 on top wall 40 (FIGS. 4, 5 and 7). As best seen in FIG. 4, projecting structures 76 and 78 space mounting arm 18 from upper flange 30 of mounting bracket 20 and urge arm 18 downward to press projection 45 against the medial portion of spring 28. Referring to FIGS. 10 and 11, upper flange 30 of mounting bracket 20 includes a pair of corresponding cooperating surfaces, such as recesses or detents 80 and 82, which are positioned to receive projecting structures 76 and 78 when arm 18 is pivoted about bushing 29 to its folded, break-away position. It can be appreciated that spring 28 urges arm 18 upwardly toward upper flange 30 of bracket 20. Therefore, when arm 18 is rotated with sufficient force to overcome the frictional forces between projecting structures 76 and 78 and the lower surface 30a of upper flange 30, projecting structures 76 and 78 are urged to engage and enter recesses 80 and 82, which permits arm 18 to move upwardly within the mounting bracket 20 and thereby releases the downward force being applied to spring 28 by projection 45. Consequently, at least some or all of the potential energy in spring 28 is released. Therefore, when projecting structures 76 and 78 are seated in recesses 80 and 82, the downward force on sleeve 26 is reduced, if not eliminated, and mirror subassembly 16 can be readily slid and repositioned along arm 18 to adjust the position of mirror subassembly 16 with respect to door 12 of vehicle 14. The repositioning of mirror subassembly 16 along swivel arm 18 is only then limited by stops 66 and 68. As described previously, stops 66 and 68 project downwardly from spring 28 so that the distal end 26a of sleeve 26 abuts stop 68 when of mirror subassembly 16 is moved along arm 18 to its most retracted or inboard position, and inner edge 26b of sleeve 26 abuts stop 66 when mirror subassembly 16 is moved to its most extended, outboard position along arm 18 to thereby limit the movement of mirror subassembly 16 and prevent inadvertent disengagement of mirror subassembly 16 from arm 18. To again fix the position of mirror subassembly 16 along arm 18 in its new position, arm 18 is simply pushed downwardly toward lower flange 32 with sufficient force to bend or compress spring 28 and disengage projecting structures 76 and 78 from recesses 80 and 82. Then, arm 18 is rotated back to its normal operating position with mirror subassembly 16 fixed in its new position along arm 18.

It can be understood from the foregoing that mirror subassembly 16 is selectively moveable along on swivel arm 18 so that mirror subassembly 16 can be positioned in a normal operation position close to door 12 of vehicle 14 for viewing regions near the rearward portion of vehicle 14 and in a towing position extended from door 12 of vehicle 14 with an expanded field of view for viewing regions near the rearward portion of a towed object. Furthermore, spring 28 provides two functions: a release mechanism that permits mirror subassembly 16 and arm 18 to break away into a folded position toward door 12 of vehicle 14 when the mirror subassembly 16 or arm 18 encounters an obstacle with sufficient force to overcome the frictional engagement between projection structures 76 and 78 and lower surface 30a of upper flange 30; and a positive holding mechanism to retain mirror subassembly 16 in a selected position along mounting arm 18.

Figure 12:
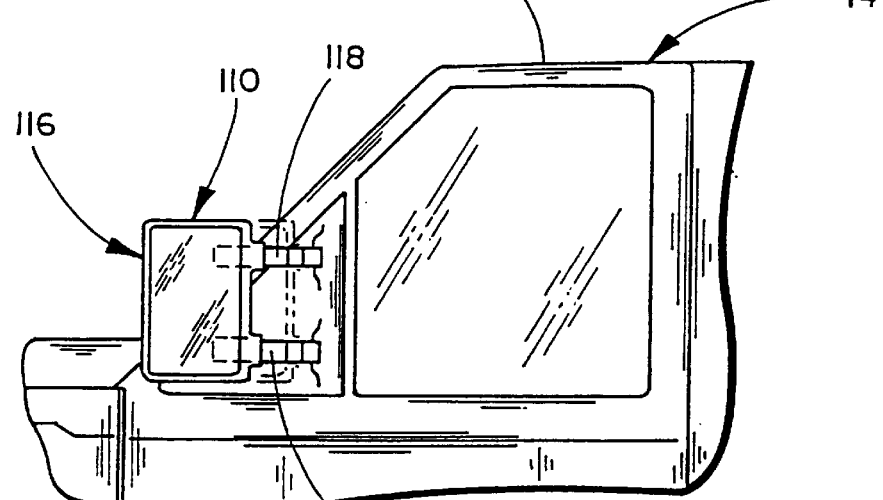
FIG. 12 is a side elevational view of a second embodiment of the exterior rearview mirror assembly mounted to a vehicle.
Figure 13:
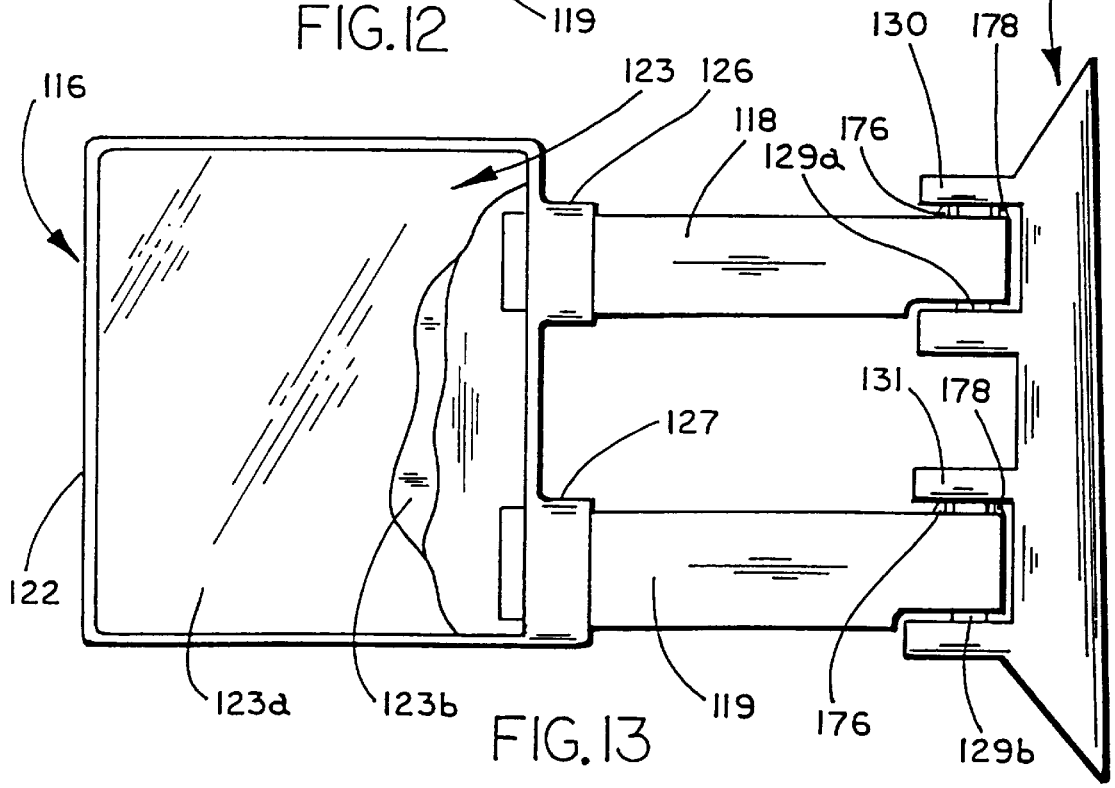
FIG. 13 is an enlarged elevational view of the second embodiment of the exterior rearview mirror assembly.

Referring to FIGS. 12 and 13, a second embodiment of exterior mirror assembly 110 is provided which includes a pair of mounting arms 118 and 119. Mounting arms 118 and 119 respectively pivotally mount a mirror subassembly 116 to a pair of mounting bracket 120. Mirror subassembly 116 includes a casing or housing 122, which houses reflective subassembly 123. Reflective subassembly 123 is of similar composition to reflective subassembly 23 and includes a reflective element 123a, which is supported on a backing plate 123b. For further details of reflective assembly 123, reference is made to reflective assembly 23.

Housing 122 includes a pair of spaced apart sleeves 126 and 127, which respectively receive arms 118 and 119 therethrough. Arms 118 and 119 are of similar construction to mounting arm 18 and each include a spring to bias mounting arms 118 and 119 into frictional engagement with sleeves 126 and 127, respectively. Reference is made to arm 18 for details of its construction and operation, since mounting arms 118 and 119 are preferably of substantially identical construction to arm 18 of the previous embodiment. In a similar manner to spring 28 of the previous embodiment, the springs in mounting arms 118 and 119 provide a breakaway device for mirror assembly 110 As best seen in FIG. 12, arms 118 and 119 each include projecting structures 176 and 178 that space arms 118 and 119 from upper flanges 130 and 131 of mounting bracket 120 in the same manner as projections 76, 78 on arm 18. Furthermore, upper flanges 130 and 131 each include recesses like recesses 80 and 82 of mounting bracket 20, which receive projecting structures 176 and 178 when arms 118 and 119 and mirror subassembly 116 are pivoted about mounting bracket 120 on bushings 129a and 129b. In this manner, when projecting structures 176 and 178 are seated in their respective recesses of upper flanges 130 and 131, the forces on the springs are released so that mirror subassembly 116 can be translated along arms 118 and 119. Again, to fix the position of mirror subassembly 116 on arms 118 and 119, a force sufficient to bend the springs must be applied to either the mirror subassembly 116 or arms 118 and 119 to disengage projected structures 176 and 178 from the recesses in upper flanges 130 and 131 of mounting bracket 120. To move mirror subassembly 116 to its normal operating position, a force sufficient to overcome the friction between projecting structures 176 and 178 and upper flange 130 and 131 of mounting bracket 120 must be applied to pivot arms 118 and 119 about bushings 129a and 129b.

It should be understood that exterior rearview mirror assembly 110 may also be assembled with only one of the arm 118 or 119 having a substantially identical structure to arm 18 of the previous embodiment. In this manner, the second arm 118 or 119 provides an unbiased arm and provides only vertical support for mirror housing 122. Generally, the second unbiased arm 118 or 119 acts as a guide for mirror housing 122 so that as the biased arm 118 or 119 is rotated, the unbiased arm 118 or 119 will freely translate in and out of the respective sleeve 126 of housing 122. It should be also be understood that exterior mirror assembly 110 may include a pair of mounting brackets, with each mounting bracket including an upper flange and a lower flange, similar to mounting bracket 20 of the previous embodiment.

Furthermore while various forms of the invention have been shown and described, other forms will now be apparent to those skilled in the art. For instance, the projections may be formed on the upper flange of the mounting brackets and the recesses formed on the mounting arm. Moreover, the mounting arms 18, 118, or 119 inlay comprise solid tubular members in which case the material of the arms would preferably comprise a light weight plastic, such as a suitable thermoplastic resin. The embodiment of the invention shown in the drawings is not intended to limit the scope of the invention which is defined by the claims which follow.

The embodiments of the invention in which exclusive property or privilege is claimed are defined as:

1. An adjustable exterior rearview mirror assembly for a vehicle comprising:

a mirror subassembly including a housing and a reflective element within said housing, said reflective element providing a rearward field of view for a driver of the vehicle;

said mirror subassembly adjustable along at least one mounting arm between at least a retracted position close to the body of the vehicle for normal, non-towing use and an extended position outboard of said retracted position allowing an expanded rearward field of view for the driver when the vehicle is towing;

said exterior rearview mirror assembly further including a mounting bracket adapted for mounting said assembly to the vehicle;

said at least one mounting arm pivotally mounted for movement about said mounting bracket between a normal operating position and a folded, break-away position, said mounting arm including a biasing member, said mounting arm moving from said normal operating position towards said folded, break-away position in the event said mirror subassembly strikes an object during use of the vehicle; and said biasing member comprising a spring, said spring biasing said mirror subassembly into a frictional engagement with said at least one mounting arm whereby said biasing member limits movement of said mirror subassembly along said at least one mounting arm and said mirror subassembly is fixed in position along said at least one mounting arm when said mounting arm is in said normal operating position, said at least one mounting arm being adapted to apply a compressive force to said spring when said at least one mounting arm is in said normal operating position, said compressive force being relieved when said at least one mounting arm is pivoted about said mounting bracket towards said folded, break-away position whereby said mirror subassembly is adjustable along said at least one mounting arm when said mounting arm is moved from said normal operating position towards said folded, break-away position.

2. The adjustable exterior rearview mirror assembly of claim 1, wherein said spring comprises a plate spring.

3. The adjustable exterior rearview mirror assembly of claim 1, wherein said at least one mounting arm frictionally engages said mounting bracket when said mirror assembly is in said normal operating position to thereby limit rotation of said at least one mounting arm about said bracket.

4. The adjustable exterior rearview mirror assembly of claim 1, wherein said at least one mounting arm frictionally engages said housing of said mirror subassembly when said mirror subassembly is in said normal operating position to hold said mirror subassembly in position on said at least one mounting arm.

5. The adjustable exterior rearview mirror assembly of claim 1, wherein said mirror subassembly further comprises one of a manual actuator and an electric actuator, said one of a manual actuator and an electric actuator allowing movement of said reflective element in order to adjust said rearward field of view.

6. The adjustable exterior rearview mirror assembly of claim 1, wherein said reflective element comprises a chrome reflective element.

7. The adjustable exterior rearview mirror assembly of claim 1, wherein said reflective element comprises a variable reflectance reflective element.

8. The adjustable exterior rearview mirror assembly of claim 7, wherein said variable reflectance reflective element comprises an electro-optic reflective element.

9. The adjustable exterior rearview mirror assembly of claim 8, wherein said electro-optic reflective element comprises an electrochromic cell.

10. An adjustable exterior rearview mirror assembly for a vehicle comprising:

a mirror subassembly including a housing and a reflective element within said housing, said reflective element providing a rearward field of view for a driver of the vehicle;

said mirror subassembly adjustable along at least one mounting arm between at least a retracted position close to the body of the vehicle for normal, non-towing use and an extended position outboard of said retracted position allowing an expanded rearward field of view for the driver when the vehicle is towing;

said exterior rearview mirror assembly further including a mounting bracket adapted for mounting said assembly to the vehicle;

said at least one mounting arm pivotally mounted for movement about said mounting bracket between a normal operating position and a folded, break-away position, said mounting arm moving from said normal operating position towards said folded, break-away position in the event said mirror subassembly strikes an object during use of the vehicle; and said at least one mounting arm frictionally engaging said housing of said mirror subassembly when said mounting arm is in said normal operating position to hold said mirror subassembly in position on said at least one mounting arm whereby said mirror subassembly is fixed in position along said at least one mounting arm when said mounting arm is in said normal operating position, said frictional engagement of said at least one mounting arm to said housing of said mirror subassembly being relieved when said mounting arm pivots about said mounting bracket from said normal operating position towards said folded, break-away position whereby said mirror subassembly is adjustable along said at least one mounting arm when said mirror subassembly is moved from said normal operating position towards said folded, break-away position.

11. The adjustable exterior rearview mirror assembly according to claim 10, wherein said reflective element comprises a chrome reflective element.

12. The adjustable exterior rearview mirror assembly according to claim 10, wherein said reflective element comprises a variable reflectance reflective element.

13. The adjustable exterior rearview mirror assembly according to claim 10, wherein said mirror subassembly further includes an actuator, said actuator allowing movement of said reflective element in order to adjust said rearward field of view.

14. The adjustable exterior rearview mirror assembly according to claim 10, wherein said at least one mounting arm includes a biasing member, said biasing member urging said at least one mounting arm to frictionally engage said housing of said mirror subassembly when said mounting arm is in said normal operating position.

15. The adjustable exterior rearview mirror assembly of claim 14, wherein said biasing member comprises a plate spring.

16. An adjustable exterior rearview mirror assembly for a vehicle comprising:

a mirror subassembly including a housing and a reflective element within said housing, said reflective element providing a rearward field of view for a driver of the vehicle;

said mirror subassembly adjustable along at least one mounting arm between at least a retracted position close to the body of the vehicle for normal, non-towing use and an extended position outboard of said retracted position allowing an expanded rearward field of view for said driver when the vehicle is towing;

said exterior rearview mirror assembly further including a mounting bracket adapted for mounting said assembly to the vehicle;

said at least one mounting arm pivotally mounted for movement about said mounting bracket between a normal operating position and a folded, break-away position, said mounting arm moving from said normal operating position towards said folded, break-away position in the event said mirror subassembly strikes an object during use of the vehicle; and said at least one mounting arm including a biasing member, said biasing member comprising a spring, said spring biasing said mirror subassembly into frictional engagement with said at least one mounting arm and said at least one mounting arm engages said housing of said mirror subassembly to hold said mirror subassembly in position on said at least one mounting arm when said mirror subassembly is in said normal operating position wherein said biasing member limits movement of said mirror subassembly along said at least one mounting arm and said mirror subassembly is fixed in position along said at least one mounting arm when said mounting arm is in said normal operating position, said at least one mounting arm being adapted to apply a compressive force to said spring when said at least one mounting arm is in said normal operating position, said compressive force being relieved when said at least one mounting arm is pivoted about said mounting bracket towards said folded, break-away position wherein said mirror subassembly is adjustable along said at least one mounting arm when said mirror subassembly is moved from said normal operating position towards said folded, break-away position.

17. The adjustable exterior rearview mirror assembly of claim 16, wherein said spring comprises a plate spring.

18. The adjustable exterior rearview mirror assembly of claim 16, wherein said at least one mounting arm frictionally engages said mounting bracket when said mirror assembly is in said normal operating position to thereby limit rotation of said at least one mounting arm about said bracket.

19. The adjustable exterior rearview mirror assembly of claim 16, wherein said at least one mounting arm frictionally engages said housing of said mirror subassembly when said mirror subassembly is in said normal operating position.

20. The adjustable exterior rearview mirror assembly of claim 16, wherein said mirror subassembly further comprises one of a manual actuator and an electric actuator, said one of a manual actuator and an electric actuator allowing movement of said reflective element in order to adjust said rearward field of view.

21. The adjustable exterior rearview mirror assembly of claim 16, wherein said reflective element comprises a chrome reflective element.

22. The adjustable exterior rearview mirror assembly of claim 16, wherein said reflective element comprises a variable reflectance reflective element.

23. The adjustable exterior rearview mirror assembly of claim 22, wherein said variable reflectance reflective element comprises an electro-optic reflective element.

24. The adjustable exterior rearview mirror assembly of claim 23, wherein said electro-optic reflective element comprises an electrochromic cell.

25. An adjustable exterior rearview mirror assembly for a vehicle comprising:

a mirror subassembly including a housing and a reflective element within said housing, said reflective element providing a rearward field of view for a driver of the vehicle;

said mirror subassembly adjustable along at least one mounting arm between at least a retracted position close to the body of the vehicle for normal, non-towing use and an extended position outboard of said retracted position allowing an expanded rearward field of view for said driver when the vehicle is towing;

said exterior rearview mirror assembly further including a mounting bracket adapted for mounting said assembly to the vehicle;

said at least one mounting arm pivotally mounted for movement about said mounting bracket between a normal operating position and a folded, break-away position, said mounting arm moving from said normal operating position towards said folded, break-away position in the event said mirror subassembly strikes an object during use of the vehicle;

said at least one mounting arm frictionally engaging said housing of said mirror subassembly when said mounting arm is in said normal operating position whereby said mirror subassembly is fixed in position along said at least one mounting arm when said subassembly is in said normal operating position, said frictional engagement of said at least one mounting arm to said housing of said mirror subassembly being relieved when said mounting arm pivots about said mounting bracket from said normal operating position towards said folded, break-away position whereby said mirror subassembly is adjustable along said at least one mounting arm when said mounting arm is moved from said normal operating position towards said folded, break-away position; and said at least one mounting arm engaging said housing of said mirror subassembly when said mounting arm is in said normal operating position to hold said mirror subassembly in position on said at least one mounting arm whereby said mirror assembly is fixed in position along said mounting arm when said mounting arm is in said normal operating position.

26. The adjustable exterior rearview mirror assembly according to claim 25, further comprising a biasing member, said biasing member urging said at least one mounting arm into frictional engagement with said housing of said mirror subassembly when said mounting arm is in said normal operating position.

27. The adjustable exterior rearview mirror assembly according to claim 26, wherein said biasing member comprises a plate spring.

28. The adjustable exterior rearview mirror assembly according to claim 25, wherein said reflective element comprises one of a chrome reflective element and a variable reflectance reflective element.

29. An adjustable exterior rearview mirror assembly for a vehicle comprising:

a mirror subassembly including a housing and a reflective element within said housing, said reflective element providing a rearward field of view for a driver of the vehicle;

said exterior rearview mirror assembly further including a mounting bracket adapted for mounting said assembly to the vehicle;

at least one mounting arm pivotally mounted for movement about said mounting bracket between a normal operating position and a folded, break-away position, said mounting arm moving from said normal operating position towards said folded, break-away position in the event said mirror subassembly strikes an object during use of the vehicle;

said mirror subassembly being fixed in position along said at least one mounting arm when said subassembly is in said normal operating position and said mirror subassembly being adjustable along said at least one mounting arm between at least a retracted position close to the body of the vehicle for normal, non-towing use and an extended position outboard of said retracted position allowing an expanded rearward field of view for said driver when the vehicle is towing when said mirror subassembly is moved from said normal operating position towards said folded, break-away position;

wherein said at least one mounting arm engages said housing of said mirror subassembly when said mounting arm is in said normal operating position to hold said mirror subassembly in position on said at least one mounting arm; and wherein said engagement of said at least one mounting arm to said housing of said mirror subassembly is relieved when said mounting arm pivots about said mounting bracket from said normal operating position towards said folded, break-away position.

30. The adjustable exterior rearview mirror assembly of claim 29, wherein said at least one mounting arm includes a biasing member, said biasing member limiting movement of said mirror subassembly along said at least one mounting arm when said mirror subassembly is in said normal operating position.

31. The adjustable exterior rearview mirror assembly of claim 30, wherein said biasing member comprises a spring, said spring biasing said mirror subassembly into frictional engagement with said at least one mounting arm.

32. The adjustable exterior rearview mirror assembly of claim 31, wherein said at least one mounting arm is adapted to apply a compressive force to said spring when said at least one mounting arm is in said normal operating position, said compressive force being relieved when said at least one mounting arm is pivoted about said mounting bracket towards said folded, break-away position.

33. The adjustable exterior rearview mirror assembly of claim 31, wherein said spring comprises a plate spring.

34. The adjustable exterior rearview mirror assembly of claim 29, wherein said at least one mounting arm frictionally engages said mounting bracket when said mirror assembly is in said normal operating position to thereby limit rotation of said at least one mounting arm about said bracket.

35. The adjustable exterior rearview mirror assembly of claim 29, wherein said at least one mounting arm frictionally engages said housing of said mirror subassembly when said mirror subassembly is in said normal operating position.

36. The adjustable exterior rearview mirror assembly of claim 35, wherein said frictional engagement of said at least one mounting arm to said housing of said mirror subassembly is relieved when said mirror subassembly pivots about said mounting bracket from said normal operating position towards said folded, break-away position.

37. The adjustable exterior rearview mirror assembly of claim 29, wherein said mirror subassembly further comprises one of a manual actuator and an electric actuator, said one of a manual actuator and an electric actuator allowing movement of said reflective element in order to adjust said rearward field of view.

38. The adjustable exterior rearview mirror assembly of claim 29, wherein said reflective element comprises a chrome reflective element.

39. The adjustable exterior rearview mirror assembly of claim 29, wherein said reflective element comprises a variable reflectance reflective element.

40. The adjustable exterior rearview mirror assembly of claim 39, wherein said variable reflectance reflective element comprises an electro-optic reflective element.

41. The adjustable exterior rearview mirror assembly of claim 40, wherein said electro-optic reflective element comprises an electrochromic cell.

42. The adjustable exterior rearview mirror assembly according to claim 29, further comprising a biasing member urging said at least one mounting arm into engagement with said housing of said mirror subassembly when said mounting arm is in said normal operating position.

43. The adjustable exterior rearview mirror assembly according to claim 42, wherein said biasing member comprises a plate spring.

44. The adjustable exterior rearview mirror assembly according to claim 43, wherein said plate spring extends from said mounting bracket and into said mirror subassembly.

45. The adjustable exterior rearview mirror assembly according to claim 29, wherein said reflective element comprises one of a chrome reflective element and a variable reflectance reflective element.

* * * * *

UNITED STATES PATENT AND TRADEMARK OFFICE
CERTIFICATE OF CORRECTION

PATENT NO.     : 6,113,241
DATED          : September 5, 2000
INVENTOR(S)    : Steven G. Hoek Page 1 of 1

It is certified that error appears in the above-identified patent and that said Letters Patent is hereby corrected as shown below:

Column 1,
Lines 5-7, please delete ".This is a continuation application of copending application Ser. No. 08/521,458, filed Mar. 21, 1997,"

Column 7,
Line 38, insert -- . -- after "110"

Column 8,
Line 15, "inlay" should be -- may --

Signed and Sealed this

Seventh Day of December, 2004

JON W. DUDAS
*Director of the United States Patent and Trademark Office*